UNITED STATES PATENT OFFICE.

HANS KUZEL, OF BADEN, NEAR VIENNA, AUSTRIA-HUNGARY, ASSIGNOR TO GENERAL ELECTRIC COMPANY, A CORPORATION OF NEW YORK.

SOLDER FOR INCANDESCENT-LAMP FILAMENTS.

969,109.  Specification of Letters Patent.  Patented Aug. 30, 1910.

No Drawing.  Application filed November 20, 1906. Serial No. 344,334.

*To all whom it may concern:*

Be it known that I, HANS KUZEL, of Baden, near Vienna, Empire of Austria-Hungary, have invented certain new and useful Improvements in Solders for Incandescent-Lamp Filaments, of which the following is a full, clear, and exact description.

My invention relates to improvements in solders for electrically connecting the filaments of electric incandescence lamps to the supply wires, described in my prior patent of Feb. 9, 1909, No. 912,245.

My improvement consists in connecting the filaments of electric incandescence lamps with their supply wires by means of the carbid of aluminium with or without the addition of an excess of one of its constituent elements. The carbid of aluminium is particularly suitable for establishing such connection on account of the great resistance aluminium offers to disintegration under the action of high tension currents, or, as it is called, its great cathodic hardness. This great resistance to disintegration of aluminium makes the connection made with its carbid very durable and reliable even in incandescence lamps operated at high voltage, whereas when the connection between the filaments and supply wires of electric incandescence lamps are made in the usual way by means of a cement, the latter is destroyed after a comparatively short time, particularly when the lamp is operated with high voltage alternating currents.

I add in many cases to the aluminium carbid a substance capable of raising its melting temperature. Such substance may be any of the metals melting at very high temperatures, as manganese, cromium, molybdenum, tungsten, uranium, vanadium, tantalum, niobium, titanium, thorium, zirconium, nickel, cobalt and iron or the carbids thereof and also antimony, the alloys of which with aluminium have a melting temperature by about 400° centigrade higher than pure aluminium. Or such substance may be a mixture of two or more of the said elements or their carbids or of such elements and carbids. Besides in many cases I add to the aluminium carbid, substances capable of increasing the adhesion of the fused aluminium carbid to the materials to be soldered, viz: the filament and the supply wires. Such adhesion increasing substance may be any one of the metals, copper, silver, gold, platinum, osmium and iridium or their carbon compounds.

I am aware that copper, gold, platinum, osmium and iridium do not form well defined carbids (whereas silver does) but it is well known that these metals absorb comparatively large quantities of carbon when heated in the presence of the latter and these absorption products I wish to be understood to be included in the term carbon compounds. Or such adhesion increasing substance may be a mixture of two or more of the said metals or their carbon compounds, or of such metals and carbon compounds.

In carrying out my invention I bring the points to be connected into contact with a highly heated (that is to say heated up to fusion or softening) mass composed of the carbid of aluminium with or without an excess of one of its constituent elements (either carbon or aluminium) and with or without the addition of substances capable of raising the melting temperature, such as antimony or metals melting at high temperatures or their carbids and with or without the addition of adhesion increasing substances such as copper, gold, silver, platinum, osmium or iridium or their carbon compounds. While so heated, the mass adheres to the parts to be connected and on cooling down and setting it firmly connects the same, forming a good electric connection which will not be disintegrated even by currents of very high voltage.

The soldering may be effected in various ways:—

(*a*) Aluminium carbid readily formed with or without an excess of one of its constituent elements and with or without the addition of a substance capable of raising the melting temperature of such carbid and with or without the addition of a substance capable of increasing the adhesion to the parts to be connected is applied while in a molten state to the points of connection and is then permitted to cool down and thereby to set so that the parts are firmly soldered together: or (*b*) The substance or mixture of substances named under *a* are mixed with a suitable agglomerant to form a plastic mass which is applied while cold to the points of connection, then dried and then highly heated, that is to say, heated to a temperature at which the mixture fuses or softens, such heating being preferably effected by the electric arc and *in vacuo* or in a neutral atmosphere. After heating the mass is permitted to cool down and thus to set:

(c) A plastic mass is prepared as set forth under *b* only instead of the aluminium carbid and other carbon compounds, if such be added to the aluminium carbid for the purposes above set forth, the constituent elements of such carbid and carbon compounds (that is to say the uncombined metal or metals and carbon or carbonaceous substances) are mixed with an agglomerant to form a plastic mass. This plastic mass is applied while cold to the points of connection and is then highly heated, preferably by the electric arc and *in vacuo* or in a neutral atmosphere or in other words in the absence of gases capable of attacking the elements used. By such heating the carbon compounds are formed and the mass is fused or softened; on cooling down and setting it firmly connects the parts.

In the electric incandescence lamps made by the process hereinbefore described the filaments are connected to their supply wires by a solder consisting of aluminium carbid with or without an excess of its constituent elements and with or without the addition of the other substances above named, such solder forming a mass solidified after melting or sintered.

I claim as my invention:

1. As a means of forming connections for incandescent lamp filaments, a solder containing carbid of aluminium.

2. As a means for forming connections for electric incandescent lamp filaments, a solder containing carbid of aluminium, and a substance increasing the adhesion of the aluminum carbid to metals.

3. As a means of forming connections for electric incandescent lamp filaments, a solder containing carbid of aluminium with a substance raising the normal melting temperature of aluminium.

4. As a means of forming connections for electric incandescent lamp filaments, a solder consisting of carbid of aluminium with the addition of an excess of one of its constituent elements and a substance raising the normal melting temperature of aluminium.

5. As a means of forming connections for electric incandescent lamp filaments, a solder consisting of carbid of aluminium with the addition of a substance raising the normal melting temperature of aluminium and increasing the adhesion of aluminium carbid to metals.

In testimony whereof I have signed my name to this specification, in the presence of two subscribing witnesses.

HANS KUZEL.

Witnesses:
JOHN GEORGE HOUD,
ALVESTO S. HOGUE.